United States Patent
Park et al.

(10) Patent No.: US 6,856,164 B2
(45) Date of Patent: Feb. 15, 2005

(54) SEMICONDUCTOR INTEGRATED CIRCUIT HAVING ON-CHIP TERMINATION

(75) Inventors: Youn-Sik Park, Yongin-shi (KR); Chang-Man Khang, Ahnyang-shi (KR)

(73) Assignee: Samsung Electronics Co., LTD, Suwon (KR)

(*) Notice: Subject to any disclaimer, the term of this patent is extended or adjusted under 35 U.S.C. 154(b) by 0 days.

(21) Appl. No.: 10/426,687

(22) Filed: May 1, 2003

(65) Prior Publication Data

US 2004/0036498 A1 Feb. 26, 2004

(30) Foreign Application Priority Data

Aug. 23, 2002 (KR) .................................. 10-2002-0050117

(51) Int. Cl.[7] .......................................... H03K 19/003
(52) U.S. Cl. ............................. 326/30; 326/86; 326/90
(58) Field of Search ................... 326/30, 90, 86, 326/21

(56) References Cited

U.S. PATENT DOCUMENTS

| | | | |
|---|---|---|---|
| 6,411,122 B1 * | 6/2002 | Mughal et al. | 326/30 |
| 6,424,170 B1 * | 7/2002 | Raman et al. | 326/30 |
| 6,690,191 B2 * | 2/2004 | Wu et al. | 326/30 |

* cited by examiner

*Primary Examiner*—Michael Tokar
*Assistant Examiner*—Lam T. Mai
(74) *Attorney, Agent, or Firm*—Harness, Dickey & Pierce, P.L.C.

(57) ABSTRACT

A semiconductor integrated circuit includes at least one pad coupled to a bus line, a transmitter for transmitting a signal from an internal circuit to the outside through the pad, and a termination circuit for terminating the bus line. The transmitter and the termination circuit are disposed to surround the pad, reducing a size of the semiconductor integrated circuit.

11 Claims, 3 Drawing Sheets

SEMICONDUCTOR INTEGRATED CIRCUIT HAVING ON-CHIP TERMINATION

This U.S. nonprovisional patent application claims priority under 35 U.S.C. § 119 of Korean Patent Application 2002-50117 filed on Aug. 23, 2002, the entire contents of which are hereby incorporated by reference.

FIELD OF THE INVENTION

The present invention relates to a semiconductor integrated circuit, and more particularly, to a semiconductor integrated circuit having a bus termination circuit for terminating a bus.

BACKGROUND OF THE INVENTION

To suppress signal reflection caused by an integrated circuit device on a reception or transmission side, a bus used for transmitting a signal between different integrated circuit devices (e.g., a microprocessor, a chipset, a memory, a memory controller, a graphic controller) may be terminated by a termination resistor. Signal reflection negatively influences signal integrity. In particular, in a system supporting a high-speed operation, signal reflection negatively influence signal integrity even more. Therefore, it is necessary to terminate a bus for transmitting a signal. Generally, a termination resistor should be provided to a bus which is adjacent to an integrated circuit device as close as possible in order to suppress the signal reflection (or in order to certainly terminate a bus).

In recent years, there is an increasing demand to shrink the dimensions of non-volatile memory devices such as a microprocessor or an application specific integrated circuit (ASIC). A ball grid array (BGA) has been developed as a semiconductor package to meet this demand. The BGA is an array in which external ports (balls-shaped lead) are disposed on the bottom side of a package so as to be amenable to a multi-pin arrangement. The BGA-type semiconductor integrated circuit package adopts a pin grid array (PGA) concept as well as a flip chip concept. As compared with a conventional quad flat package (QFP), the BGA-type semiconductor integrated circuit package is advantageous to reduce a space occupied by a semiconductor package, improve electrical and thermal conductivity, and save cost in a multi-pin arrangement (300 pins or more).

In a conventional BGA package, external ports disposed on the bottom side of a package are electrically connected to bus lines. When the bus lines are terminated, external ports closely disposed at a center of the package are relatively far away from corresponding termination resistors as compared with external ports adjacent to edges of the package. That is, remaining bus lines exist between the external bus lines disposed at the center of the package and their corresponding termination resistors. The remaining bus lines result in a signal reflection. Thus, in a case where the BGA-type semiconductor integrated circuit package is used, a termination structure to enhance a signal integrity may be necessary. To meet this demand, an on-die termination structure has been suggested in which a bus is terminated. As used here, the term "on-die termination" may be synonymous with "on-chip termination" or "active termination".

An example of the on-die termination structure is disclosed in the U.S. Pat. No. 6,157,206 entitled "ON-CHIP TERMINATION", in which an semiconductor integrated circuit device includes an on-chip input buffer, a termination circuit, and an impedance control circuit. The termination circuit is constructed in the integrated circuit device to terminate a bus line coupled to the input buffer. The impedance control circuit is coupled to an external reference resistor and controls the impedance of the termination circuit to have the same value as the external reference resistor.

The input buffer (or an output buffer) and the termination circuit may be disposed around a pad so as to reduce an effect caused by a noise at a long signal line.

SUMMARY OF THE INVENTION

In an exemplary embodiment the present invention provides a semiconductor integrated circuit in which a pad, an input buffer (or output buffer), and a termination circuit are efficiently disposed.

In an exemplary embodiment the present invention provides a semiconductor integrated circuit layout in which a pad, an input buffer (or output buffer), and a termination circuit may be efficiently disposed to reduce the size of a semiconductor integrated circuit.

In an exemplary embodiment, the present invention is directed to a semiconductor integrated circuit which includes at least one pad coupled to at least one bus line, a transmitter for transmitting a signal from an internal circuit to the outside through the pad, and a termination circuit for terminating the bus line. The transmitter and the termination circuit may be disposed to surround the pad.

In another exemplary embodiment, the pad is a rectangular or square pad having four sides.

In another exemplary embodiment, the transmitter has a plurality of pull-up transistors coupled between a power supply voltage and the pad and pull-down transistors coupled between the pad and a ground voltage. The termination circuit has a plurality of pull-up resistors coupled between the power supply voltage and the pad and a plurality of pull-down resistors coupled between the pad and the ground voltage.

In another exemplary embodiment, the pull-up and pull-down transistors of the transmitter are disposed to face the first and second sides of the rectangular or square pad. The pull-up and pull-down resistors of the termination circuit are disposed to face the third and fourth sides of the rectangular or square pad.

In another exemplary embodiment, the present invention is directed to a semiconductor integrated circuit which includes a rectangular or square pad coupled to a bus line and has four sides, a transmitter for transmitting a signal from an internal circuit to the outside through the pad, and a termination circuit for terminating the bus line. The transmitter is disposed to face the first and second sides of the rectangular or square pad. The termination circuit is disposed to face the third and fourth sides of the rectangular or square pad.

In another exemplary embodiment of the present invention, a semiconductor integrated circuit includes at least one pad coupled to at least one bus line, a transmitter for transmitting a signal from an internal circuit to the outside through the pad, and a termination circuit for terminating the bus line. The transmitter has a plurality of pull-up transistors coupled between a power supply voltage and the pad and a plurality of pull-down transistors coupled between the pad and a ground voltage. The termination circuit has a plurality of pull-up resistors coupled between the power supply voltage and the pad and a plurality of pull-down resistors coupled between the pad and the ground voltage. The pull-up transistors of the transmitter and the pull-up resistors of the termination circuit are disposed at a first region to surround the portion of one side of the pad. The pull-down transistors of the transmitter and the pull-down resistors of the termination circuit are disposed at a second region to surround the portion of the other side of the pad.

In another exemplary embodiment, the first and second regions are symmetrically disposed with the pad sandwiched therebetween. Each of the first and second regions are horseshoe-shaped to surround the pad.

DESCRIPTION OF THE PREFERRED EMBODIMENT

A semiconductor integrated circuit according to an exemplary embodiment of the present invention is now described below with reference to FIG. 1.

Figure 1:
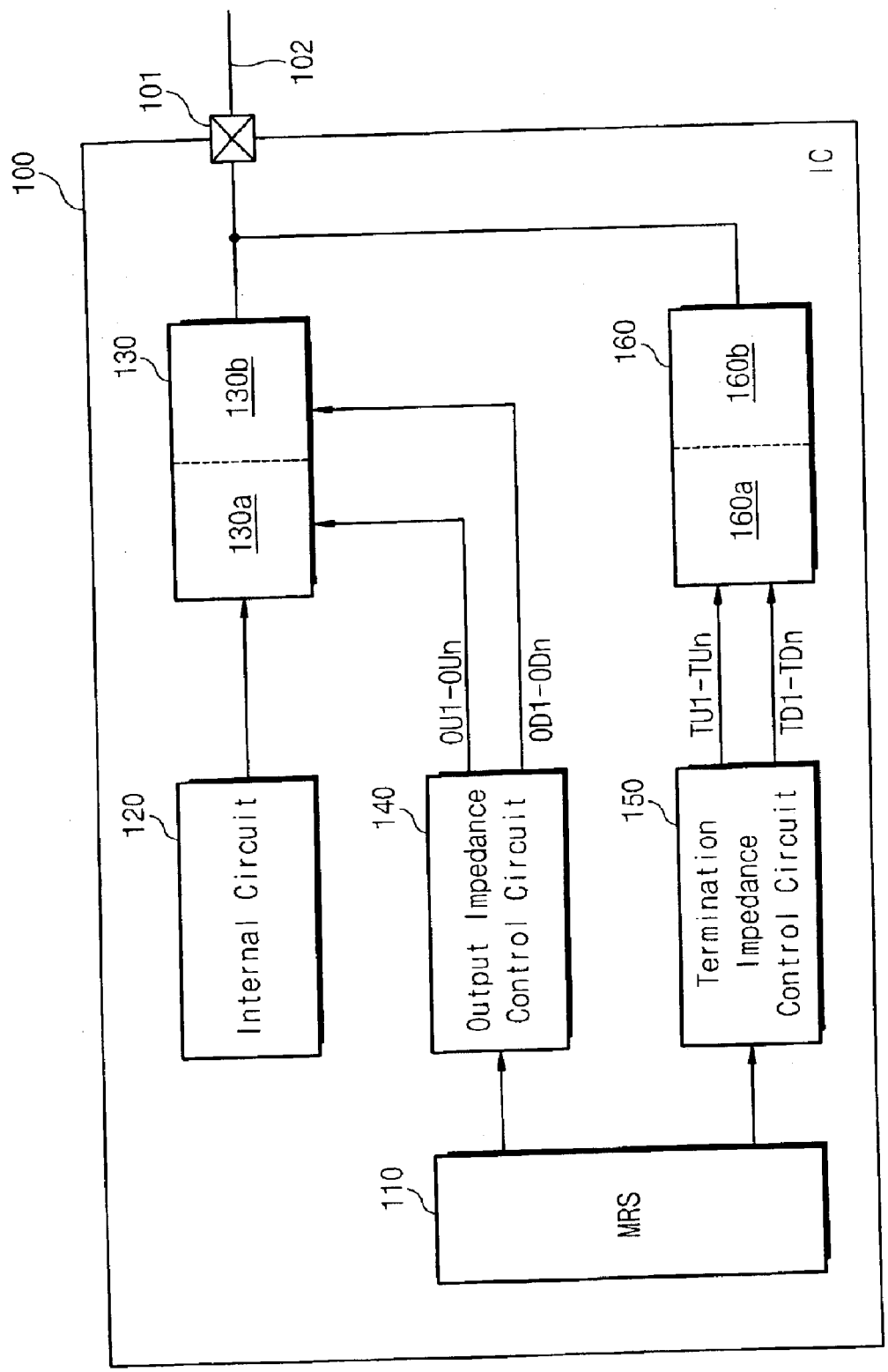
FIG. 1 is a block diagram of a semiconductor integrated circuit according to an exemplary embodiment of the present invention.

As shown in FIG. 1, a semiconductor integrated circuit 100 includes a bonding pad 101, a mode register set (MRS) 110, an internal circuit 120, an output driver (or output buffer) 130, an output impedance control circuit 140, a termination impedance circuit 150, and a termination circuit 160. The bonding pad 101 is electrically connected to a bus line 102 for transmitting a signal. The output driver 130 is coupled to the bonding pad 101 and drives a signal from the internal circuit 120 to the bonding pad 101. The termination circuit 160 is coupled to the bonding pad 101 so as to terminate the bus line 102. Although not shown in FIG. 1, it should be understood that other output drivers corresponding to other bonding pads may also be provided. In this case, the termination circuit 160 is to be coupled to the respective bonding pad.

Output impedance data for setting an impedance of the output driver 130 and termination impedance data for setting an impedance of the termination circuit 160 are stored in the mode register set 110. The output impedance control circuit 140 generates output impedance control signals OU1–OUn and OD1–ODn for reading out the output impedance data stored in the mode register set 110 to set the impedance of the output driver 130. The termination control circuit 150 generates termination impedance control signals TU1–TUn and TD1–TDn for reading out the terminal impedance data stored in the mode register set 110 to set the impedance of the termination circuit 160.

The output driver 130 has a pull-up transistor array 130a and a pull-down transistor array 130b. The termination circuit 160 has a pull-up resistor array 160a and a pull-down resister array 160b.

An exemplary construction and exemplary layout of the output driver 130 and the termination circuit 160 shown in FIG. 1 are now described below with reference to FIG. 2.

Figure 2:
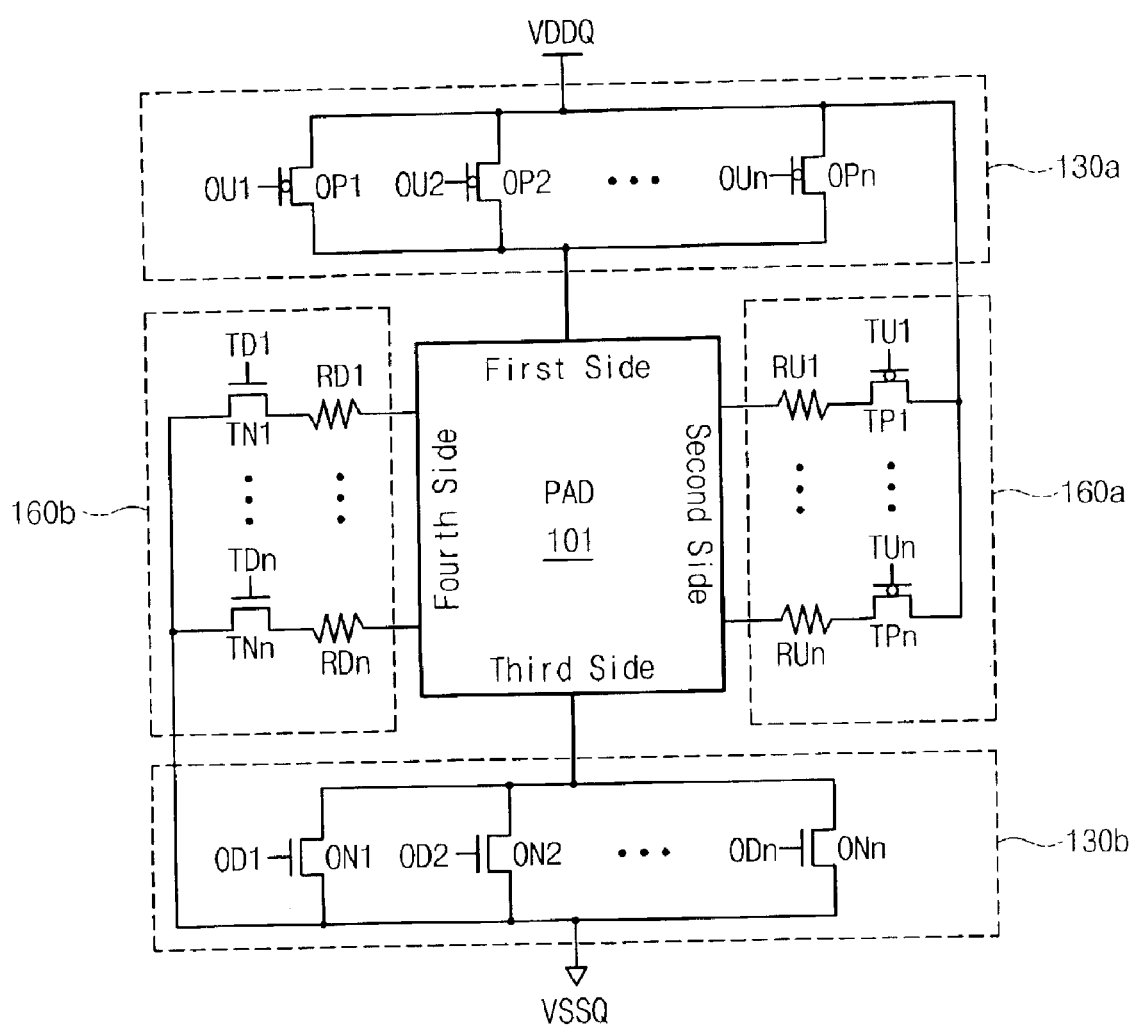
FIG. 2 is an exemplary circuit diagram of an output circuit and a termination circuit shown in FIG. 1.

As shown in FIG. 2, a pull-up transistor array 130a includes a plurality of PMOS transistors OP1–OPn connected in parallel between a power supply voltage VDDQ and a bonding pad 101. The PMOS transistors OP1–OPn are controlled by corresponding output impedance control signals OU1–OUn from an output impedance control circuit 140, respectively. A pull-down transistor array 130b includes a plurality of NMOS transistors ON1–ONn connected in parallel between the bonding pad 101 and a ground voltage VSSQ. The NMOS transistors ON1–ONn are controlled by corresponding output impedance control signals OD1–ODn from the output impedance control circuit 140, respectively.

A pull-up resistor array 160a includes resistors RU1–RUn and PMOS transistors TP1–TPn. Each of the resistors TP1–TPn has one end coupled to the pad 101. Each of the PMOS transistors TP1–TPn has a drain and a source coupled between a power supply voltage VDDQ and the other end of the corresponding resistors RU1–RUn. The PMOS transistors TP1–TPn are controlled by corresponding termination impedance control signals TU1–TUn from a termination impedance control circuit 150. The pull-down resistor array 160b includes resistors RD1–RDn and NMOS transistors TN1–TNn. Each of the resistors RD1–RDn has one end that is coupled to the pad 101. Each of the NMOS transistors TN1–TNn has a drain and a source coupled between a power supply voltage and the other end of the respective corresponding resistors RD1–RDn. The NMOS transistors TN1–TNn are controlled by respective corresponding termination impedance control signals TD1–TDn from a termination impedance control circuit 150.

The pull-up transistor array 130a, the pull-down transistor array 130b, the pull-up resistor array 160a, and the pull-down resistor array 160b surround the square pad 101 having four sides. The pull-up transistor array 130a and the pull-up resistor array 160a may be disposed to face the first and second sides of the pad 101. The pull-down transistor array 130b and the pull-down resistor array 106b may be disposed to face the third and fourth sides of the pad 101.

According to the above-described exemplary layout, the output driver 130 and the termination circuit 160 of the semiconductor integrated circuit 100 may be closely disposed to each side of the bonding pad 101. As a result, an area of the layout is reduced.

Although FIGS. 1 and 2 show exemplary numbers of components, the present invention is not so limited. For example, the present invention is not limited in any way to a particular number of transistors in the pull-up transistor array 130a and the pull-down transistor array 130b in the output driver 130, and is not limited in any way to a particular number of resistors in the pull-up resistor array 160a and the pull-down resistor array 160b in the termination circuit 160.

Other exemplary layouts of the pull-up transistor array 130a, the pull-down transistor array 130b, the pull-up resistor array 160a, and the pull-down resistor array 160b, which are shown in FIG. 1, are now described below with reference to FIG. 3A and FIG. 3B.

Figure 3A:
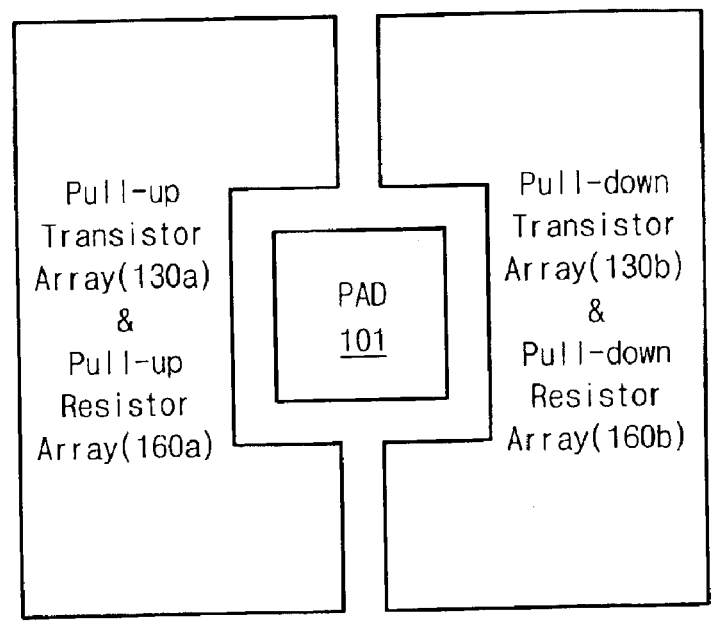
FIG. 3A and FIG. 3B are layout diagrams of a pull-up transistor array, a pull-down transistor array, a pull-up resistor array, and a pull-down resistor array according to other exemplary embodiments of the present invention.

As shown in FIG. 3A, a pull-up transistor array 130a of an output driver 130 and a pull-up resistor array 160a of a termination circuit 160 are disposed to the left side of a pad 101 on the basis of a central longitudinal axis of the pad 101. They may be horseshoe-shaped to surround the pad 101. A pull-down transistor array 130b of the output driver 130 and a pull-down resistor array 160b of the termination circuit 160 are disposed to the right side of the pad 101 on the basis of the longitudinal axis of the pad. They may also be horseshoe-shaped to surround the pad 101.

Figure 3B:
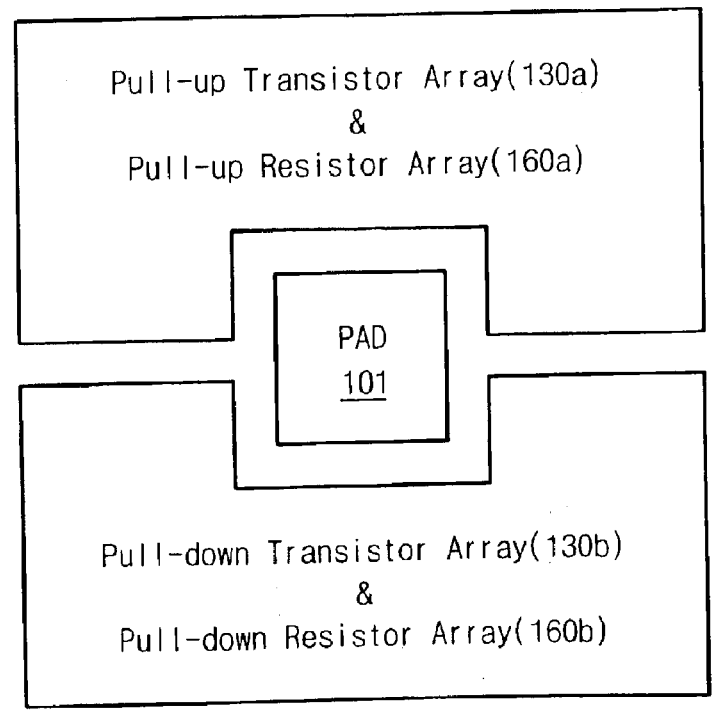

Referring to FIG. 3B, a pull-up transistor array 130a of an output driver 130 and a pull-up resistor array 160a of a termination circuit 160 may be disposed to the upper side of a pad 101 on the basis of a central transverse axis of the pad 101. They may be horseshoe-shaped to surround the pad 101. A pull-down transistor array 130b of the output driver 130 and a pull-down resistor array 160b of the termination circuit 160 may be disposed to the lower side of the pad 101 on the basis of the transverse axis of the pad. They may also be horseshoe-shaped to surround the pad 101.

Although the present invention has been described above in conjunction with a square pad, any other shape or combination of shapes, could be utilized as would be know to one of ordinary skill in the art. For example, a rectangular pad could also be utilized.

While this invention has been particularly shown and described with reference to the exemplary embodiments described above, it will be understood by those skilled in the art that these exemplary embodiments do not limit the present invention, and that various changes in form and details may be made without departing from the spirit and scope of the invention as defined by the appended claims.

What is claimed is:

1. A semiconductor integrated circuit comprising:

at least one pad coupled to at least one bus line;

a transmitter for transmitting a signal from an internal circuit externally via the at least one pad; and a termination circuit for terminating the at least one bus line, wherein the transmitter and the termination circuit are disposed to surround the at least one pad.

2. The semiconductor integrated circuit of claim 1, wherein the at least one pad is a rectangular pad having four sides including a first side, second side, third side and fourth side.

3. The semiconductor integrated circuit of claim 2, wherein the transmitter includes:

a plurality of pull-up transistors coupled between a power supply voltage and the rectangular pad in parallel; and a plurality of pull-down transistors coupled between the rectangular pad and a ground voltage in parallel.

4. The semiconductor integrated circuit of claim 2, wherein the termination circuit includes:

a plurality of pull-up resistors coupled between the power supply voltage and the rectangular pad in parallel; and a plurality of pull-down resistors coupled between the rectangular pad and the ground voltage in parallel.

5. The semiconductor integrated circuit of claim 3, wherein the plurality of pull-up transistors and the plurality of pull-down transistors in the transmitter are disposed to face the first and second sides of the rectangular pad.

6. The semiconductor integrated circuit of claim 4, wherein the plurality of pull-up resistors and the plurality of pull-down resistors in the termination circuit are disposed to face the third and fourth sides of the rectangular pad.

7. A semiconductor integrated circuit comprising:

a bus line;

a s rectangular pad coupled to the bus line, the rectangular pad having four sides including a first side, second side, third side and fourth side;

a transmitter for transmitting a signal from an internal circuit externally via the rectangular pad; and a termination circuit for terminating the bus line, wherein the transmitter is disposed to fact the first and second sides of the rectangular pad, and the termination circuit is disposed to the third and fourth sides of the rectangular pad.

8. The semiconductor integrated circuit of claim 7, wherein the transmitter includes:

a plurality of pull-up transistors coupled between a power supply voltage and the rectangular pad; and a plurality of pull-down transistors coupled between the rectangular pad and a ground voltage.

9. The semiconductor integrated circuit of claim 7, wherein the termination circuit includes:

a plurality of pull-up resistors coupled between the power supply voltage and the rectangular pad; and a plurality of pull-down resistors coupled between the rectangular pad and the ground voltage.

10. A semiconductor integrated circuit comprising:

at least on pad coupled to at least one bus line;

a transmitter for transmitting a signal from an internal circuit externally via the pad, the transmitter and the termination circuit including a plurality of pull-up transistors coupled between a power supply voltage and the pad in parallel and a plurality of pull-down transistors coupled between the pad and a ground voltage in parallel; and a termination circuit for terminating the bus line, the termination circuit including a plurality of pull-up resistors coupled between the power supply voltage and the pad in parallel and a plurality of pull-down resistors coupled between the pad and the ground voltage in parallel, wherein the plurality of pull-up transistors in the transmitter and the plurality of pull-up resistors in the termination circuit are disposed in a first region to surround a portion of the pad, and the plurality of pull-down transistors in the transmitter and the plurality of pull-down resistors in the termination circuit are disposed in a second region to surround a remaining portion of the pad.

11. The semiconductor integrated circuit of claim 10, wherein a first and second regions are symmetrically disposed with the pad sandwiched therebetween, and each of the first and second regions is horseshoe-shaped to surround the pad.

* * * * *